United States Patent
Yoshie et al.

(10) Patent No.: US 6,863,296 B2
(45) Date of Patent: Mar. 8, 2005

(54) GUARD ARM WITH DRINK CONTAINER HOLDING STRUCTURE AND STROLLER PROVIDED WITH THE SAME

(75) Inventors: Toshiro Yoshie, Tokyo-To (JP); Yutaka Ukitsu, Tokyo-To (JP); Tokihiko Ikuno, Tokyo-To (JP)

(73) Assignee: Combi Corporation, Tokyo-To (JP)

( * ) Notice: Subject to any disclaimer, the term of this patent is extended or adjusted under 35 U.S.C. 154(b) by 30 days.

(21) Appl. No.: 10/254,525

(22) Filed: Sep. 26, 2002

(65) Prior Publication Data

US 2003/0057682 A1 Mar. 27, 2003

(30) Foreign Application Priority Data

Sep. 26, 2001 (JP) .................................... 2001-293893

(51) Int. Cl.[7] .............................. B62B 7/04; B62B 7/08
(52) U.S. Cl. ...................... 280/642; 280/647; 280/650; 280/658; 280/47.38
(58) Field of Search ................................ 280/642, 647, 280/650, 644, 658, 47.38, 47.4; 297/256.15, 256.16, 256.17, 250.1, 252

(56) References Cited

U.S. PATENT DOCUMENTS

| | | | | |
|---|---|---|---|---|
| 4,101,143 A | * | 7/1978 | Sieber | 280/42 |
| RE31,760 E | * | 12/1984 | Kassai | 280/644 |
| 4,610,460 A | * | 9/1986 | Kassai | 280/650 |
| 4,856,809 A | * | 8/1989 | Kohus et al. | 280/644 |
| 4,930,697 A | * | 6/1990 | Takahashi et al. | 224/275 |
| 5,458,394 A | * | 10/1995 | Nichols et al. | 297/173 |
| 5,855,384 A | * | 1/1999 | Pike et al. | 280/47.38 |
| 5,964,501 A | * | 10/1999 | Magnani | 297/174 R |
| 6,302,033 B1 | * | 10/2001 | Roudebush | 108/25 |
| 6,368,006 B1 | * | 4/2002 | Yang et al. | 403/84 |
| 6,375,213 B1 | * | 4/2002 | Suzuki | 280/649 |
| 6,409,205 B1 | * | 6/2002 | Bapst et al. | 280/642 |
| 6,478,327 B1 | * | 11/2002 | Hartenstine et al. | 280/642 |
| 6,561,536 B2 | * | 5/2003 | Suzuki | 280/642 |

* cited by examiner

Primary Examiner—Paul N. Dickson
Assistant Examiner—Bridget Avery
(74) Attorney, Agent, or Firm—Wenderoth, Lind & Ponack, L.L.P.

(57) ABSTRACT

A guard arm with a drink container holding structure is extended between front end parts of right and left armrests of a stroller to protect a baby on the stroller. The guard arm includes a flexible guide arm body connecting the front end parts of the right and left armrests, and a pair of drink container holding members formed of a comparatively hard material and connected to opposite ends of the guide arm body, respectively. The drink container holding members are detachably connected to the front end parts of the armrests, respectively. Also, the drink container holding members are provided with recesses, for receiving drink containers therein, in their upper surfaces, respectively.

8 Claims, 4 Drawing Sheets

GUARD ARM WITH DRINK CONTAINER HOLDING STRUCTURE AND STROLLER PROVIDED WITH THE SAME

BACKGROUND OF THE INVENTION

1. Field of the Invention

The present invention relates to a stroller and, more particularly, to a guard arm with a drink container holding structure suitable for a stroller foldable in three, and a stroller provided with the guard arm.

2. Description of the Related Art

There have been proposed various folding strollers for carrying a baby outdoors for walking or shopping, adapted to be folded to facilitate storing and carrying. Sometimes, a drink, such as milk, is given to a baby sitting on the stroller. It is desired that the stroller is provided with a drink table for temporarily supporting a nursing bottle thereon.

There have been proposed strollers foldable in two and chairs for babies provided with a flat table that can be extended between right and left armrests for temporarily supporting a nursing bottle or the like thereon. A stroller foldable in three has a body having right and left side parts that can be folded to fold the stroller into a small width (i.e. a distance between the right and left side parts decreases). Therefore, a stroller foldable in three cannot be folded if a flat table is extended between right and left armrests, and hence, the flat table must be removed from the stroller when the stroller is folded.

SUMMARY OF THE INVENTION

The present invention has been made in view of the foregoing problem, and it is therefore an object of the present invention to provide a guard arm with a drink container holding structure, suitable for use on a stroller foldable in three, not required to be removed when the stroller is folded and adapted to hold a nursing bottle or the like when the stroller is unfolded, and to provide a stroller provided with the guard arm with a drink container holding structure.

According to a first aspect of the present invention, a guard arm with a drink container holding structure, adapted to be extended between front end parts of right and left armrests included in a stroller, to protect a baby on the stroller, includes: a flexible guard arm body connecting the front end parts of the armrests; and at least one drink container holding member formed of a comparatively hard material, connected to one end of the guard arm body, with the at least one drink container holding member being adapted to be detachably connected to a corresponding front end part of a corresponding armrest.

In the guard arm with a drink container holding structure according to the first aspect of the present invention, it is preferable that the guard arm body has the shape of a band, and the drink container holding member has a recess, for receiving a drink container therein, in its upper surface.

According to a second aspect of the present invention, a stroller includes: a stroller body provided with right and left armrests; and a guard arm with a drink container holding structure, extended between front end parts of the right and left arm rests to protect a baby on the stroller body; wherein the guard arm includes: a flexible guard arm body connecting the front end parts of the armrests; and at least one drink container holding member formed of a comparatively hard material, connected to one end of the guard arm body, with the at least one drink container holding member being adapted to be detachably connected to a corresponding front end part of a corresponding armrest.

In the stroller according to the second aspect of the present invention, it is preferable that the guard arm body has the shape of a band, and the drink container holding member has a recess, for receiving a drink container therein, in its upper surface. It is preferable that the stroller is foldable in three.

According to the present invention, at least one drink container holding member formed of a comparatively hard material, which is detachably connected to a front end part of an armrest, is mounted on one end of a flexible guard arm body that connects front end parts of right and left armrests. Therefore, a nursing bottle or the like containing milk or the like to be given to a baby, can be placed in a recess of the at least one drink container holding member, which improves convenience of the stroller. The guard arm is able to bend easily so as to comply with movement of folding members of the stroller when the stroller is folded in three, because the guard arm body is flexible, and the guard arm serving also as a drink container holding table when used on a stroller foldable in three does not need to be removed when the stroller is stored.

DETAILED DESCRIPTION OF THE PREFERRED EMBODIMENTS

Preferred embodiments of the present invention will be described with reference to the accompanying drawings.

Figure 1:
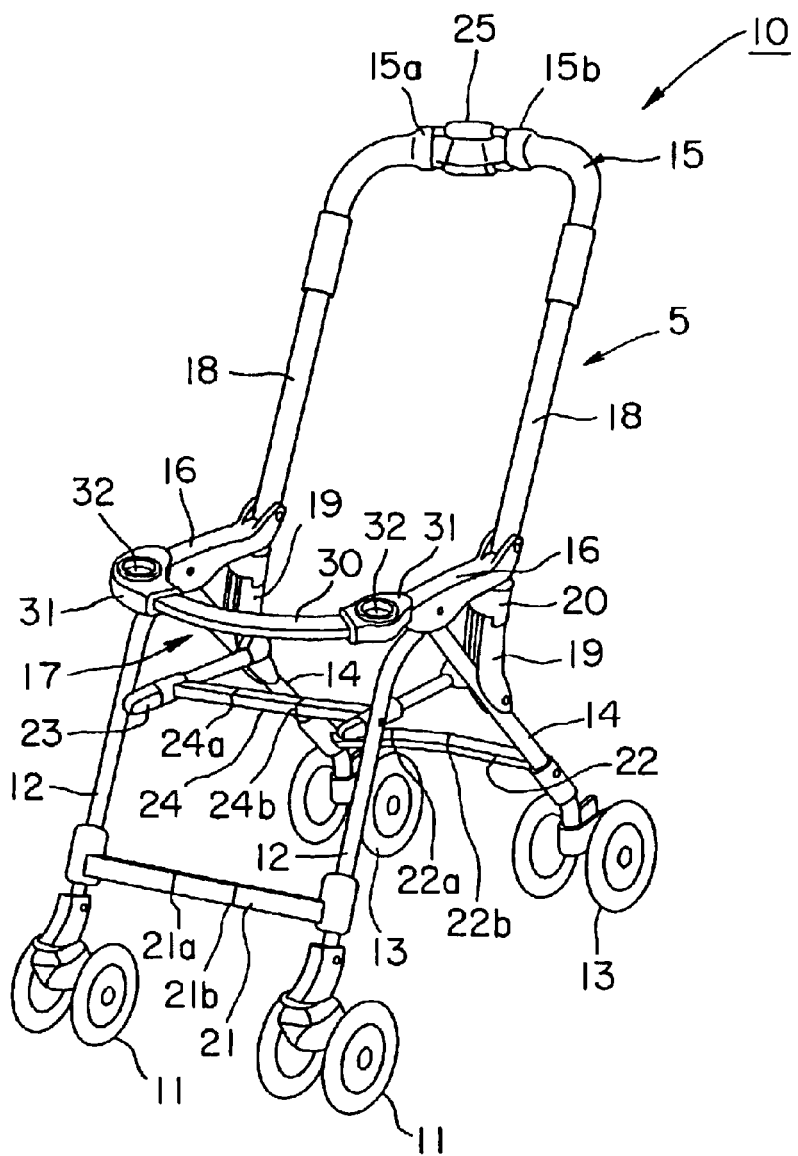
FIG. 1 is a perspective view of a stroller provided with a guard arm with a drink container holding structure in a preferred embodiment of the present invention.

Referring to FIG. 1, a stroller 10 in a preferred embodiment of the present invention has two front legs (right and left front legs) 12 provided with front wheels 11, two rear legs (right and left rear legs) 14 provided with rear wheels 13, and two armrests (right and left armrests) 16 pivotally connected to upper ends of the front legs 12 and the rear legs 14. A detachable guard arm 17 is extended between front end parts of the right and left armrests 16. Lower end parts of right and left side pipes 18, included in a substantially U-shaped handle 15, are pivotally connected to rear ends of the armrests 16, respectively.

Lower ends of L-shaped brackets 19 are pivotally joined to middle parts of the rear legs 14, respectively. Lower ends of the side pipes 18 of the handle 15 are pivotally joined to middle parts of the brackets 19, respectively. When the stroller 10 is unfolded, locking members 20, slidably mounted on lower end parts of the side pipes 18, engage with locking parts formed in upper ends of the brackets 19, respectively, to hold the stroller 10 in an unfolded state. A locking member operating mechanism 25 is incorporated into the handle 15 to operate the locking members 20 through wires (not shown), which extend through the side pipes 18 of the handle 15, so as to unlock the stroller 10 from an unfolded state.

The right and left front legs 12 are connected by a front connecting bar 21; and the right and left rear legs 14 are connected by a rear connecting bar 22. Front ends of side connecting bars 23 are pivotally joined to middle parts of the front legs 12, respectively; and rear ends of the side connecting bars 23 are pivotally joined together with the brackets 19 to the lower end parts of the side pipes 18, respectively. Middle parts of the side connecting bars 23 are connected by an upper connecting bar 24.

The front legs 12, the rear legs 14, the handle 15, the armrests 16, the connecting bars 21, 22, 23 and 24, and other members constitute a stroller body 5 foldable in three, and are adapted to be set in an unfolded state for use or in a folded state. In the unfolded state a distance between the armrests 16 is greater than a distance between the armrests when the stroller body 5 is in the folded state. In this embodiment, a fabric seat and mesh pockets are attached to the front legs 12 and the rear legs 14. In FIG. 1, the fabric seat and the mesh pockets are omitted to facilitate understanding of a general construction of the stroller 10.

As shown in FIG. 1, the locking members 20, on the lower ends of the side pipes 18, are engaged with upper locking parts of the brackets 19 to hold the stroller 10 in the unfolded state for use.

When the locking member operating mechanism 25, combined with the handle 15, is operated to disengage the locking members 20 from the brackets 19, the armrests 16 and the side connecting bars 23 are allowed to turn upwardly on pivot joints placed on the side pipes 18, so that the front legs 12 and the rear legs 14 can be folded so as to extend substantially parallel to each other so as to fold the stroller body 5 in a state facilitating carrying the stroller 10.

The front connecting bar 21, the rear connecting bar 22 and the upper connecting bar 24 have middle parts provided with joints 21a, 21b, 22a, 22b, 24a and 24b to make the front connecting bar 21, the rear connecting bar 22 and the upper connecting bar 24 foldable. The handle 15 is provided with joints 15a and 15b to turn the right and left side pipes 18 forwardly relative to the locking member operating mechanism 25 so that the handle 15 is foldable. The joints 15a, 21a, 22a and 24a, and the joints 15b, 21b, 22b and 24b are included in two parallel vertical planes, respectively.

Figure 2:
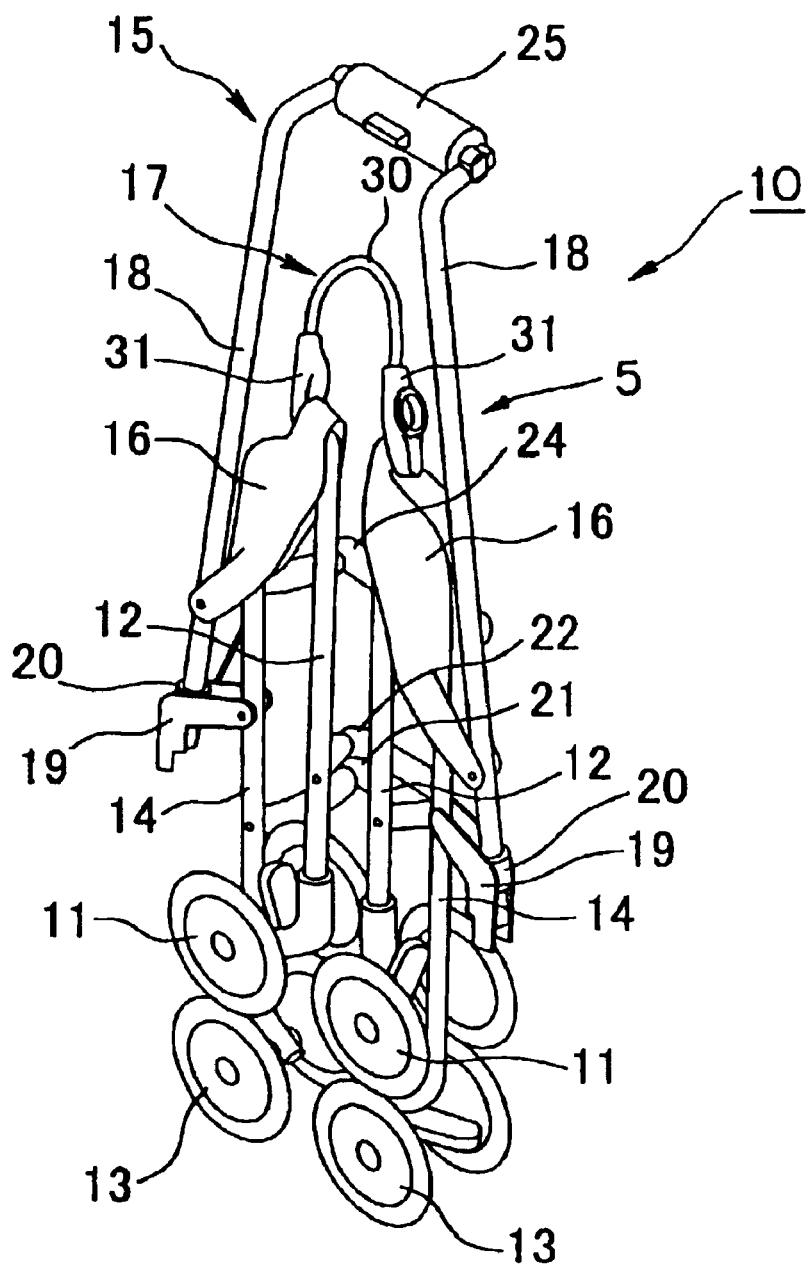
FIG. 2 is a perspective view of the stroller shown in FIG. 1 folded in three.

When the side pipes 18 are moved forwardly after folding the front legs 12 and the rear legs 14 so as to extend substantially parallel, respective end parts of the handle 15, the front connecting bar 21, the rear connecting bar 22 and the upper connecting bar 24 are bent forwardly. Consequently, the stroller body 5 can be compactly folded in three as shown in FIG. 2.

Figure 3:
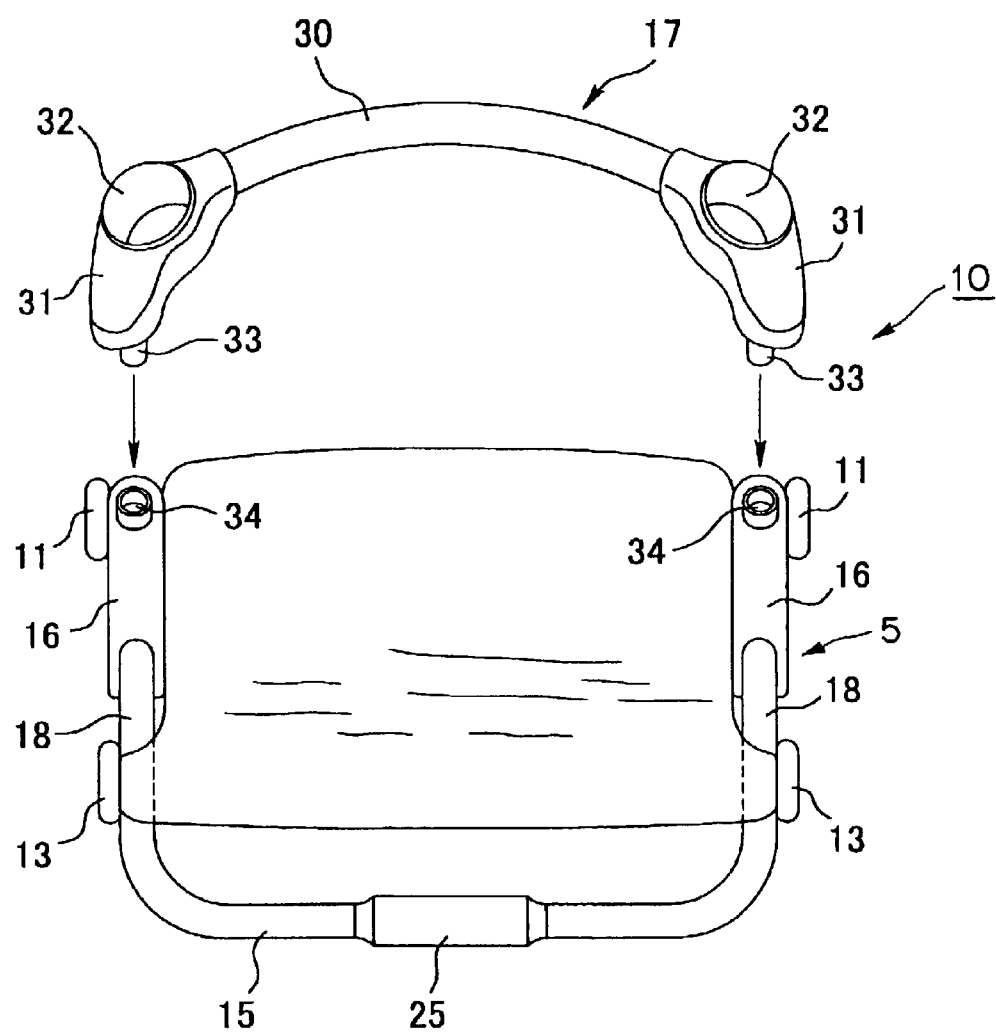
FIG. 3 is a plan view of assistance in explaining a construction of the guard arm with the drink container holding structure of the present invention, and a relationship between the guard arm with the drink container holding structure and the stroller.

FIG. 3 shows a construction of the guard arm 17, and a relationship between the guard arm 17 and the stroller body 5.

Referring to FIG. 3, the guard arm 17 has a flexible guard arm body 30 having the shape of a band, and drink container holding members 31 of a comparative hard material connected to opposite ends of the guard arm body 30, respectively. End walls of the drink container holding members 31 are provided with recesses, not shown, of a shape complementary to that of end parts of the guard arm body 30, respectively. The end parts of the guide arm body 30 are fitted into the recesses of the drink container holding members 31, respectively. Each of the drink container holding members 31 has an arcuate body of a predetermined thickness having a widened middle part. A cylindrical recess 32 for receiving a drink container, such as a nursing bottle or a drink bottle, therein is formed in a widened middle part of an upper wall of the drink container holding member 31.

A tubular projection 33 projects from a lower wall of each drink container holding member 31. Round holes 34 for receiving the tubular projections 33 of the drink container holding members 31 are formed in front end parts of the armrests 16.

The tubular projections 33 projecting from the lower walls of the drink container holding members 31, connected to the guide arm body 30 of the guide arm 17, are fitted into the round holes 34 of the armrests 16 so as to extend the guard arm 17 between front ends of the right and left armrests 16.

When the stroller body 5 is unfolded in a state where the guard arm 17 is extended between the front end parts of the right and left armrests 16, the cylindrical recesses 32 of the drink container holding members 31 open upwardly as shown in FIG. 1. Therefore, the drink container holding members 31, similarly to a conventional drink container support table, is able to hold drink containers, such as a nursing bottle and a drink bottle, temporarily in the cylindrical recesses 32.

When the stroller body 5 is folded in three as shown in FIG. 2, the flexible guard arm body 30 bends and the tubular projections 33 projecting from the lower walls of the drink container holding members 31 turn properly in the round holes 34. Consequently, opposite end parts of the guard arm 17 are twisted properly, and the guard arm 17 is bent or flexed so as to conform to the folded state of the stroller body 5.

Although the two drink container holding members 31 are connected to the opposite ends of the guard arm body 30, respectively, in this embodiment, only one drink container holding member 31 may be connected to only one of the opposite ends of the guard arm body 30.

Although the guard arm body 30 of the foregoing embodiment has the shape of a band, the guard arm body 30 may be of any suitable shape, such as a round tube.

Figure 4:
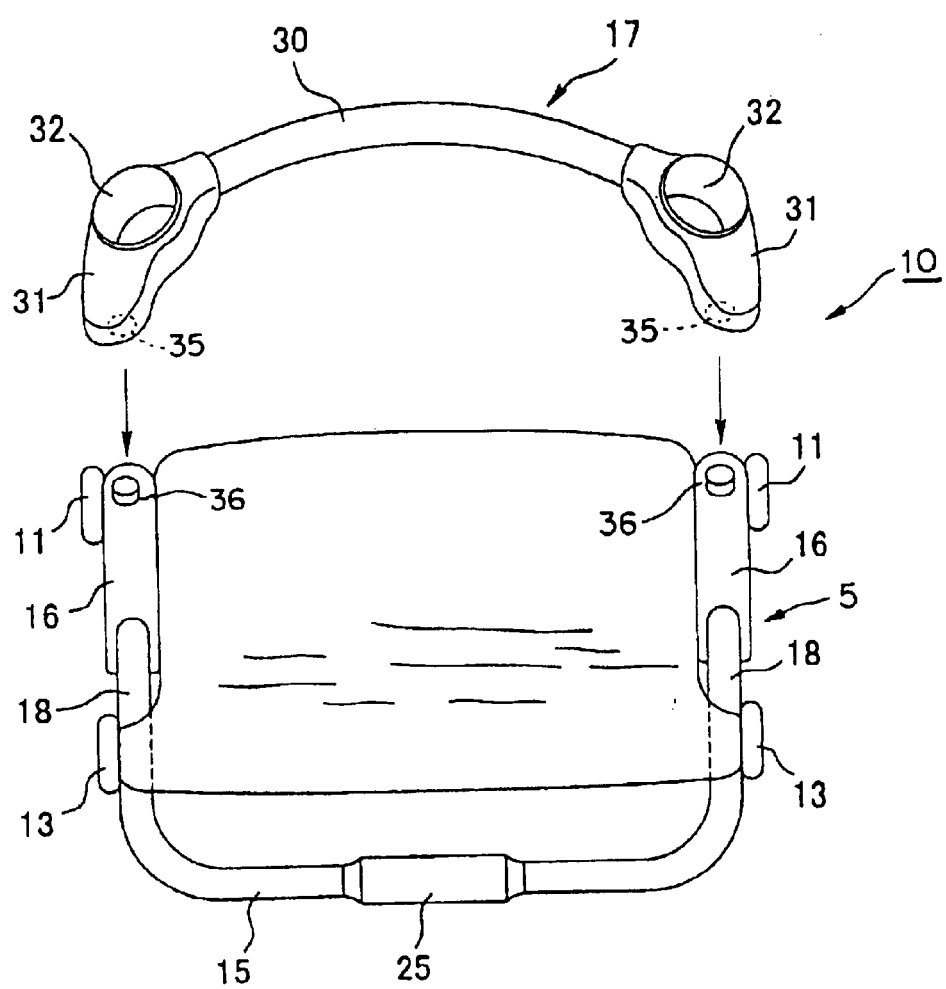
FIG. 4 is a view to that of FIG. 3, but showing a modified manner by which the guard arm is connected to armrests of the stroller.

Although the tubular projections 33 projecting from the lower walls of the drink container holding members 31 at the opposite ends of the guard arm 17 are fitted into the round holes 34 of the armrests 16, respectively, to extend the guard arm 17 between the armrests 16, the guard arm 17 may be connected to the armrests 16 by any suitable connecting structure, such as round holes 35 formed in the drink container holding members 31, and projections 36 formed in the armrests 16, as shown in FIG. 4.

What is claimed is:

1. A guard arm to protect a child when on a stroller, the stroller including a stroller body having right and left armrests, the stroller body being foldable from an unfolded state in which the right and left armrests are spaced apart by a first distance into a folded state in which the right and left armrests are spaced apart by a second distance that is less than the first distance, said guard arm comprising:

a guard arm body to be attached to front end parts of the right and left armrests so as to extend therebetween, said guard arm body being constructed such that while attached to the front end parts of the right and left armrests the stroller body can be folded from the unfolded state into the folded state, and two holding members connected to respective ends of said guard arm body, said two holding members being of a material that is harder than a material of said guard arm body and being adapted to be detachably connected to the front end parts of the right and left armrests, respectively, wherein said guard arm body is to be attached to the front end parts of the right and left armrests via said two holding members being connected to the front end parts of the right and left armrests, wherein at least one of said two holding members comprises a drink container holding member having a recess for receiving therein a drink container, and wherein said two holding members are adapted to be detachably connected to the front end parts of the right and left armrests via cylindrical projections, extending from respective lower surfaces of said two holding members, that are to be received within round holes provided in the front end parts of the right and left armrests, respectively, such that upon folding the stroller body said cylindrical projections will turn within the round holes.

2. The guard arm according to claim 1, wherein said guard arm body is flexible such that while attached to the front end parts of the right and left armrests, upon folding the stroller body from the unfolded state into the folded state said guard arm body flexes so as to conform to the stroller body when in the folded state.

3. A stroller comprising:

a stroller body having right and left armrests, the stroller body being foldable from an unfolded state in which the right and left armrests are spaced apart by a first distance into a folded state in which the right and left armrests are spaced apart by a second distance that is less than the first distance;

a guard arm including a guard arm body to be attached to front end parts of said right and left armrests so as to extend therebetween, said guard arm body being constructed such that while attached to said front end parts of said right and left armrests said stroller body can be folded from the unfolded state into the folded state; and two holding members connected to respective ends of said guard arm body, said two holding members being of a material that is harder than a material of said guard arm body and being adapted to be detachably connected to the front end parts of the right and left armrests, respectively, wherein said guard arm body is to be attached to the front end parts of the right and left armrests via said two holding members being connected to the front end parts of the right and left armrests;

wherein at least one of said two holding members comprises a drink container holding member having a recess for receiving therein a drink container; and wherein said two holding members are adapted to be detachably connected to the front end parts of the right and left armrests via cylindrical projections, extending from respective lower surfaces of said two holding members, that are to be received within round holes provided in the front end parts of the right and left armrests, respectively, such that upon folding the stroller body said cylindrical projections will turn within the round holes.

4. The stroller according to claim 3, wherein said guard arm body is flexible such that while attached to said front end parts of said right and left armrests, upon folding said stroller body from the unfolded state into the folded state said guard arm body flexes so as to conform to said stroller body when in the folded state.

5. A guard arm to protect a child when on a stroller, the stroller including a stroller body having right and left armrests, the stroller body being foldable from an unfolded state in which the right and left armrests are spaced apart by a first distance into a folded state in which the right and left armrests are spaced apart by a second distance that is less than the first distance, said guard arm comprising:

a guard arm body to be attached to front end parts of the right and left armrests so as to extend therebetween, said guard arm body being constructed such that while attached to the front end parts of the right and left armrests the stroller body can be folded from the unfolded state into the folded state, and two holding members connected to respective ends of said guard arm body, said two holding members being of a material that is harder than a material of said guard arm body and being adapted to be detachably connected to the front end parts of the right and left armrests, respectively, wherein said guard arm body is to be attached to the front end parts of the right and left armrests via said two holding members being connected to the front end parts of the right and left armrests, wherein at least one of said two holding members comprises a drink container holding member having a recess for receiving therein a drink container, and wherein said two holding members are adapted to be detachably connected to the front end parts of the right and left armrests via round holes, provided in respective lower surfaces of said two holding members, that are to receive cylindrical projections provided on the front end parts of the right and left armrests, respectively, such that upon folding the stroller body the cylindrical projections will turn within said round holes.

6. The guard arm according to claim 5, wherein said guard arm body is flexible such that while attached to the front end parts of the right and left armrests, upon folding the stroller body from the unfolded state into the folded state said guard arm body flexes so as to conform to the stroller body when in the folded state.

7. A stroller comprising:

a stroller body having right and left armrests, the stroller body being foldable from an unfolded state in which the right and left armrests are spaced apart by a first distance into a folded state in which the right and left armrests are spaced apart by a second distance that is less than the first distance, a guard arm including a guard arm body to be attached to front end parts of said right and left armrests so as to extend therebetween, said guard arm body being constructed such that while attached to said front end parts of said right and left armrests said stroller body can be folded from the unfolded state into the folded state, and two holding members connected to respective ends of said guard arm body, said two holding members being of a material that is harder than a material of said guard arm body and being adapted to be detachably connected to the front end parts of the right and left armrests, respectively, wherein said guard arm body is to be attached to the front end parts of the right and left armrests via said two holding members being connected to the front end parts of the right and left armrests, wherein at least one of said two holding members comprises a drink container holding member having a recess for receiving therein a drink container, and wherein said two holding members are adapted to be detachably connected to the front end parts of the right and left armrests via round holes, provided in respective lower surfaces of said two holding members, that are to receive cylindrical projections provided on the front end parts of the right and left armrests, respectively, such that upon folding the stroller body the cylindrical projections will turn within said round holes.

8. The stroller according to claim 7, wherein said guard arm body is flexible such that while attached to said front end parts of said right and left armrests, upon folding said stroller body from the unfolded state into the folded state said guard arm body flexes so as to conform to said stroller body when in the folded state.

* * * * *